Nov. 29, 1932.  F. R. HOUSE  1,889,363
SOUND LOCATOR
Filed March 23, 1931  4 Sheets-Sheet 1

INVENTOR
FRANK R. HOUSE.
BY
his ATTORNEY.

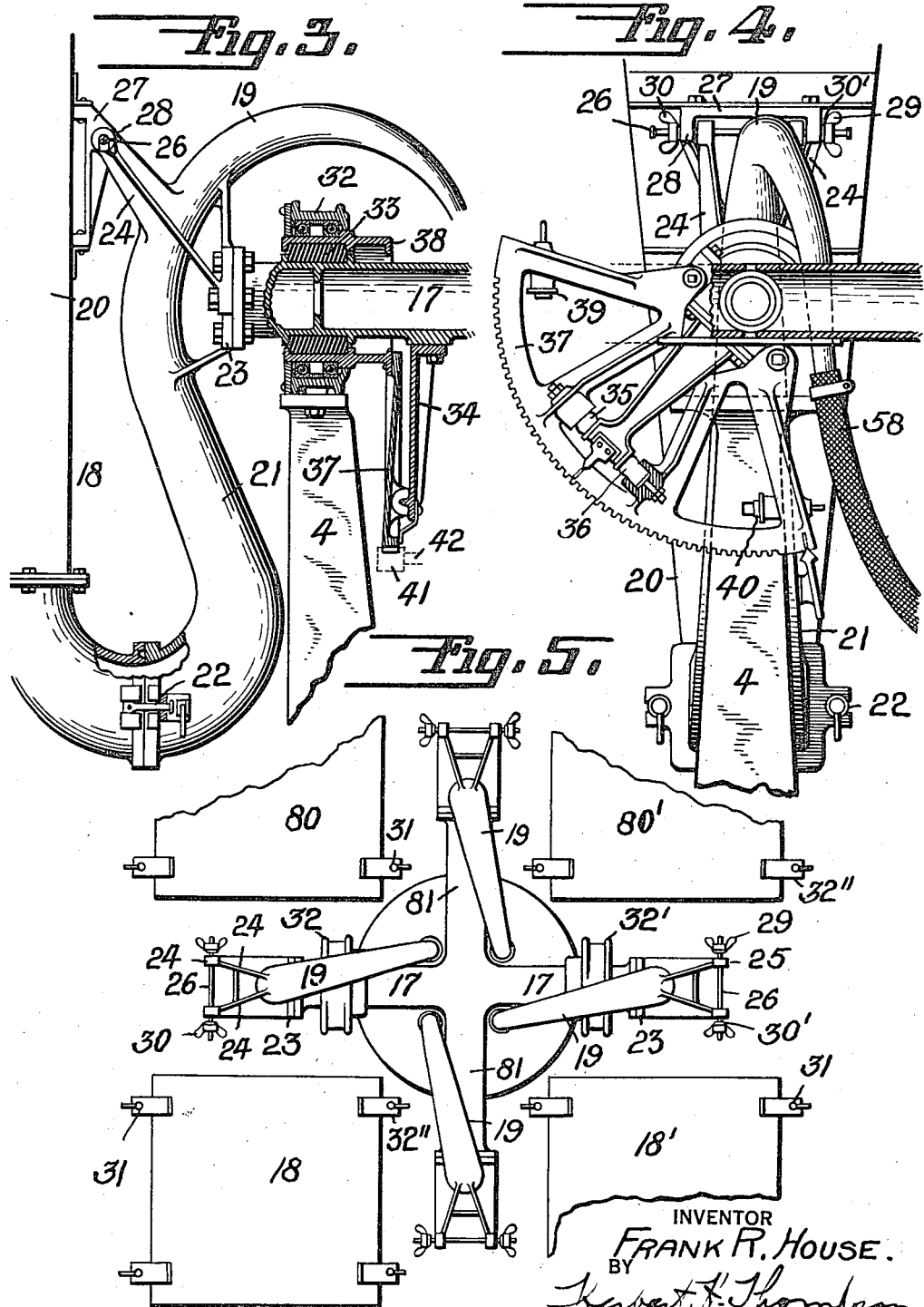

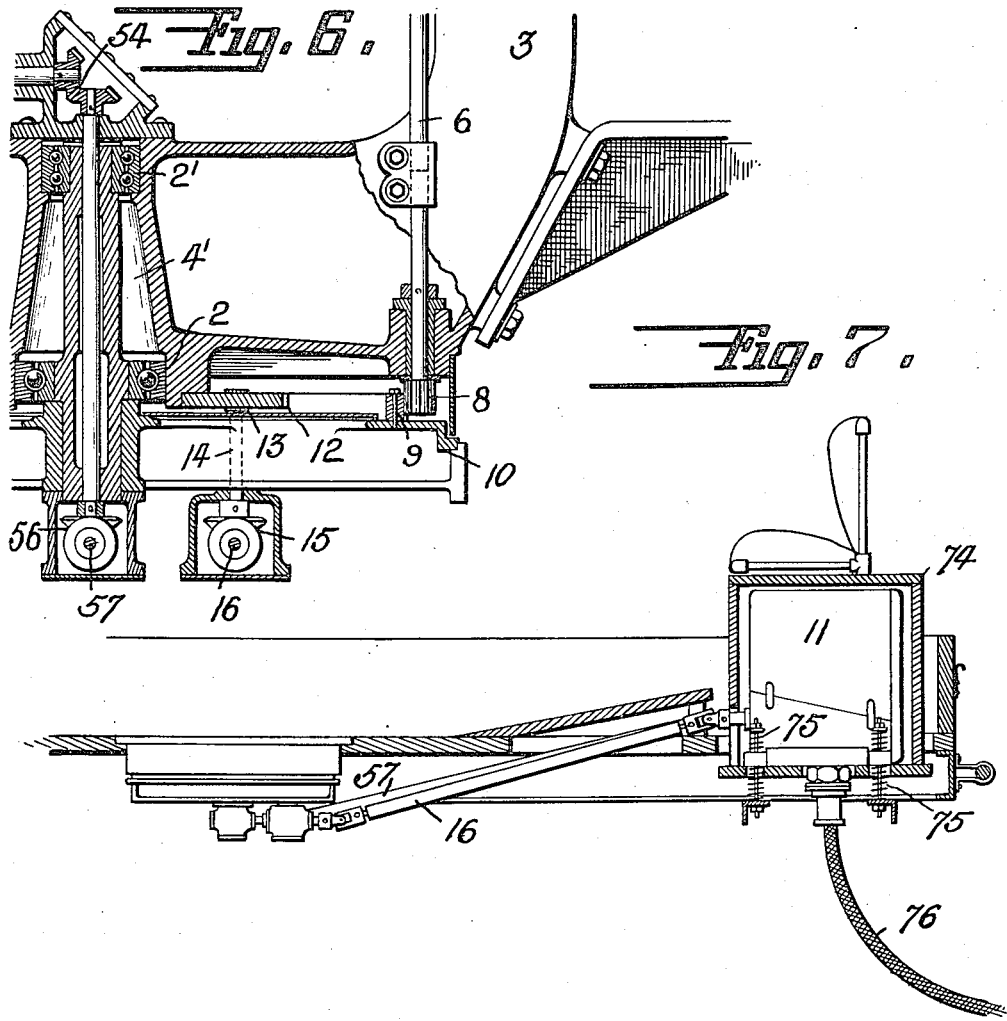

Nov. 29, 1932.   F. R. HOUSE   1,889,363
SOUND LOCATOR
Filed March 23, 1931   4 Sheets-Sheet 4
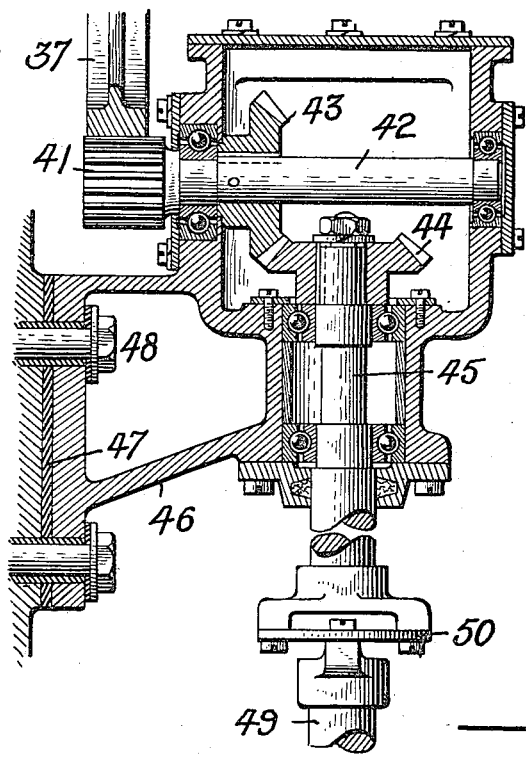
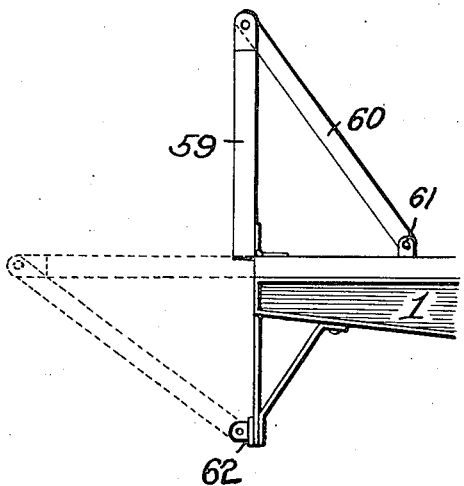
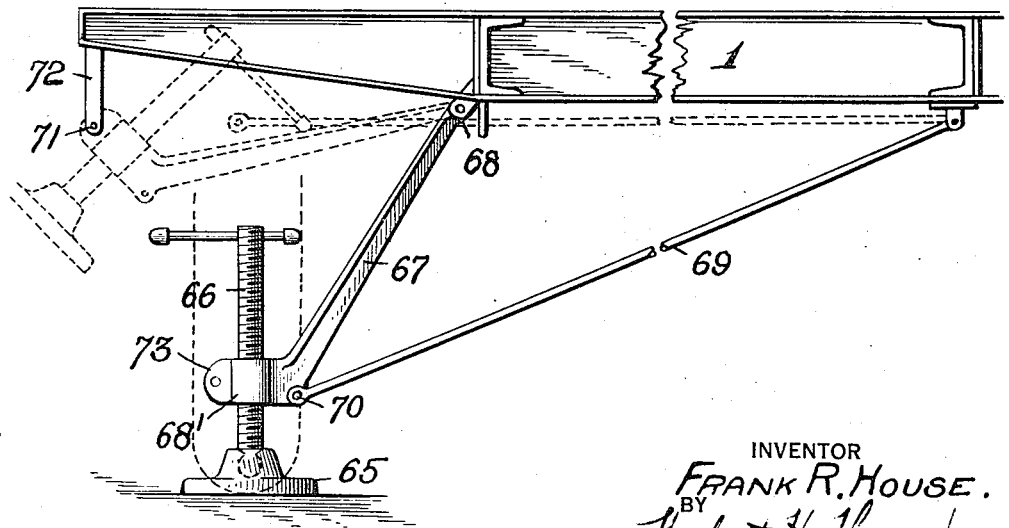
INVENTOR
FRANK R. HOUSE.
BY
ATTORNEY.

Patented Nov. 29, 1932

1,889,363

UNITED STATES PATENT OFFICE

FRANK R. HOUSE, OF BALDWIN HARBOR, NEW YORK, ASSIGNOR TO SPERRY GYROSCOPE COMPANY, INC., OF BROOKLYN, NEW YORK, A CORPORATION OF NEW YORK

SOUND LOCATOR

Application filed March 23, 1931. Serial No. 524,664.

This invention relates to sound locator horns which are employed for locating airplanes by the sound of their propellers and engines under conditions of poor visibility or darkness. Such apparatus comprises two pair of spaced horns, the units of one pair being spaced horizontally and the other pair being spaced vertically. In order to gain sufficient sensitivity the horns are made quite large and are spaced several yards apart. This invention contemplates improving the mechanical construction of the supporting and rotating means of the horn so as to give improved results and less interference by noises from the apparatus itself. A further object of the invention is to provide a more secure stationary support for the truck which carries the horns.

Referring to the drawings in which the form of my invention now preferred is shown, Fig. 1 is a side elevation of my sound locator truck with the horns and jacks mounted in the detached position for transportation.

Fig. 3 is a fragmentary elevation, partly in section, showing the horizontal trunnions for supporting one of the horns.

Fig. 4 is a section taken at right angles to Fig. 3 of the similar parts.

Fig. 5 is a plan view of the apparatus with the horns in the detached position.

Fig. 6 is a vertical sectional view through the base of the sound locator unit.

Fig. 7 is a sectional view through one end of the truck showing how the comparator mechanism is connected to the sound locator.

Fig. 8 is a sectional view through the gear box used for turning the horns in elevation.

Fig. 9 is a side view showing one of the jacks used to raise the truck when the sound locator is operating.

Fig. 10 is a side elevation showing how the side and tail boards of the truck may be used to furnish additional floor space.

Figure 2:
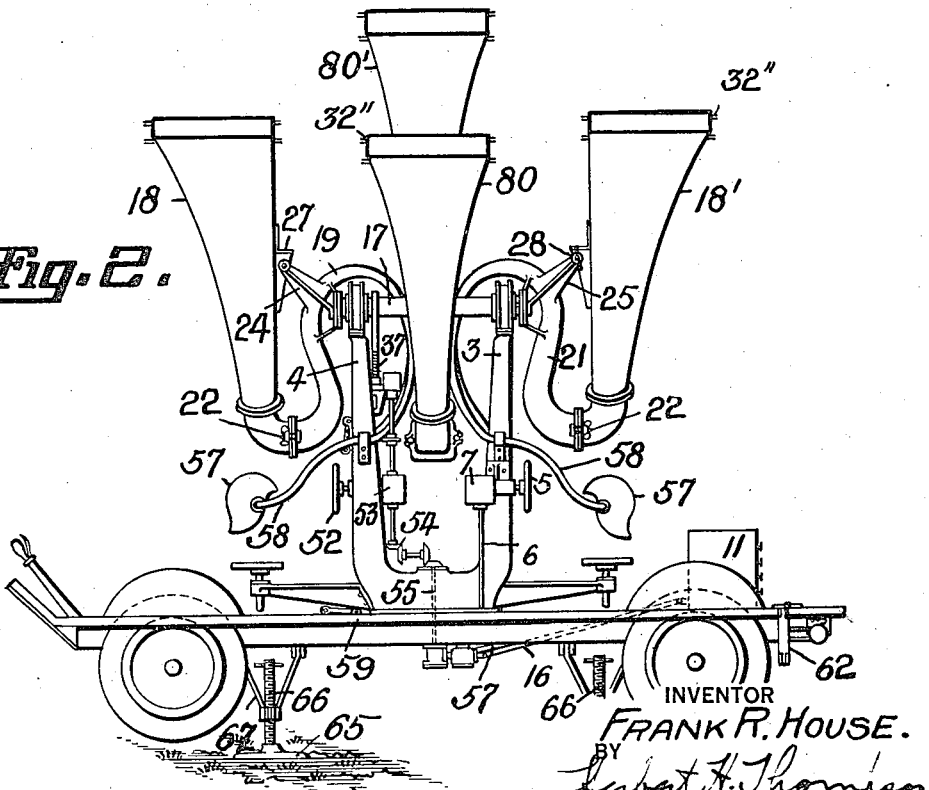
Fig. 2 is a similar elevation of the truck with the horns and jacks in the position for operating the sound locator.

The sound locator mechanism is usually mounted on a trailer truck 1 which may be towed by an auto-motive truck. In the center of the truck central vertical bearings 2 and 2' are provided on which is journalled a pair of standards 3 and 4 which are preferably cast on one U-shaped hollow piece having a central bore 4' for the bearings as shown in Figs. 2 and 6. Said standards may be rotated about said bearing by a hand wheel 5 which turns the shaft 6 through gear box 7, shaft 6 having a pinion 8 at the lower end thereof meshing with a large gear 9 fixed to the platform 10. The rotation of said standards may be transmitted to the computer mechanism in box 11 as by providing a gear 12 on the bottom of the casting with which a pinion 13 on the shaft 14 meshes. Shaft 14 drives through bevel gearing 15 extensible shaft 16 which leads into the computer 11.

The standards 3 and 4 furnish a bearing means for supporting the four horns 18, 18' and 80, 80' for adjustment in elevation. For this purpose there is provided a transverse shaft 17 which is journalled adjacent each end in bearings 32, 32' in said standards. In the prior constructions it has been the practice to make said shaft hollow and to connect the horizontally spaced horns to the interior of the shaft, using the shaft as a means for transmitting the sound to the ears of the listener. I find, however, such construction objectionable in that extraneous sounds are transmitted to the listeners from this shaft. I prefer, therefore, to secure the horns at the ends of said shafts by brackets 23 but to lead each horn around the shaft in a U-shaped reversed bend 19. The horn itself is shown as made up in two sections, an outer section 20 which comprises the flaring end having reduced lower portion and a permanently attached inner half 21 which is detachably clamped to the other half 18 of the horn as by clamps 22. The two parts together form a double U in shape, being secured to a supporting shaft near but below the top of the reverse bend.

Figure 1:
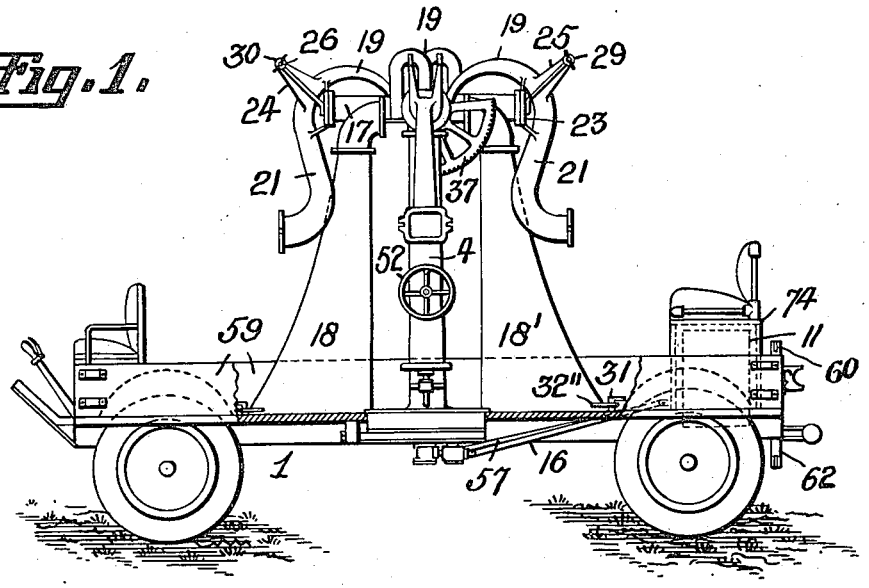

In order to furnish additional support for the outer end of the horn I may provide a detachable coupling between the outer horn 20 and the bracket 23. For this purpose arms 24 and 25 extend from the support 23 to each side of the inner horn 21. Through said brackets extends a long bolt 26 and to the horn is secured a bracket 27 having downwardly opening hooks 28 thereon which are adapted to engage the bolt, (see Fig. 3). When so engaged the wing nuts 29–30 may be screwed up on the bolts to bind the parts together, the wing nuts preferably having tapered faces 30' for this purpose. When it is desired to transport the horns, the wing nuts are loosened, the clamps 22 detached, and the horns lifted off the bolts, inverted and placed on the bottom of the truck as shown in Fig. 1 where they are clamped to the floor boards by clamp screws 31 which pass through ears 32'' on the four corners of the mouth of each horn.

For such apparatus it is very essential that no sound from the mechanism actuating the horns reach the ears of the listeners. It is, therefore, necessary to provide anti-sound transmitting means for the bearings for said shaft 17. For this purpose each ball bearing 32 which journals the shaft in the standards is made with its inner race larger than the shaft and a block of rubber 33 or other sound absorbing material is placed between the bearing and the shaft. I find it also desirable not to attempt to rotate said shaft through this supporting rubber since if attempt is made to do this the rubber must be compressed so tightly that its sound absorbing properties are greatly lessened. I prefer, therefore, to rotate the shaft 17 from a separate directly-connected torque arm 34. Also by applying the torque at a greater distance from the center of the shaft than could be done if the torque were transmitted through the bearing, I reduce the pressure at that point so that soft rubber may be used. As shown, torque is transmitted to the torque arm through a pair of rubber blocks 35—36 secured to a gear sector 37. Said sector may be journaled on the same ball bearing 33 as the shaft. For this purpose the sector is shown as secured to an annular extension 38 from the inner race of the ball bearing. By this means also the inner race of the bearing is revolved so that no torsional stress is placed on the rubber block 33. Rubber tipped stops 39—40 may also be provided on the gear sector.

The gear sector is shown as driven from a pinion 41 on a stub shaft 42 having bevel gear 43 thereon driven from a bevel gear 44 on vertical shaft 45. It should be noted that the bracket 46 which supports said shafting and gearing is also sound insulated from the standards by a rubber pad 47, rubber also being placed around and under the supporting bolts 48. Shaft 45 is also sound insulated from the driving shaft 49 as by providing a rubber or soft leather disc 50 for coupling the two shafts together.

Rotation of the horns in elevation may be accomplished by the hand wheel 52 which drives the shaft 49 through gearing (not shown) in gear box 53. The movements of the horns in elevation are also transmitted to the computer through shafting and gearing 54 turning the vertical shaft 55 which drives the same through bevel pinion 56 and extensible shaft 57 leading to the computer. The two horns 80 and 80' which are spaced in elevation are also secured to said shaft 17 as being secured to the ends of a cross bar 81 secured to or forming a part of shaft 17, the horns being carried around instead of through the shaft 81 as before. All horns, therefore, move together but one operator has entire control of the azimuth movements and another operator of the elevation movements. Each operator wears a sound proof helmet 57 having ear pieces connected by rubber tubing 58 to the small ends of the sound locator horns.

The truck itself preferably has low hinged sides 59 which in traveling are secured in the position shown in Fig. 10 as by detachable bars 60. When the sound locator is in operation, however, the pin 61 securing said bars to the floor is withdrawn, the side 59 folded down horizontally as shown in dotted lines in Fig. 10, and the bar 60 pinned underneath the truck to the ear 62 forming a support for the extension. By this means sufficient space is given the operators to walk around the sound locator apparatus without stepping off the truck.

It is also highly desirable to firmly support the truck against all movement when the sound locator is in operation. For this purpose I have found ordinary jacks entirely unsuited. I, therefore, prefer to provide special collapsible jacks. Preferably said jacks comprise a foot rest 65, an elevating member 66 which may be in the form of a threaded shaft, and a supporting bar or body 67 having one end thereof threaded in said shaft and the other end pivoted at 68 to the body of the truck. Preferably the end 68 lies nearer the center of the truck than the threaded end 68' so that a tension member 69 must be provided between the bar 67 and the truck. It will readily be seen that there is no tension on this member unless the screw has been screwed down to put the weight on the jack but when such is done there is strong tension placed on the member 69 so that the truck is held rigidly between all four jacks, each one pulling its end of the truck outwardly from the center. When, however, it is desired to move the truck, the pin 70 connecting the tension bar to the supporting bar 67 is removed and the jack is folded upwardly as shown in dotted lines in Fig. 9 where it is secured in place by a pin 71 passing through the aligning holes in bracket 72 and ear 73 on member 67.

I also prefer to mount the comparator in a box 74 on the rear of the truck, the comparator being supported on springs 75. From the comparator the electric cable 76 leads to the searchlight which is controlled from the sound locator.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a sound locator, a pair of spaced standards, a hollow shaft journalled therein, a pair of sound locator horns, each horn having a double U bend therein, and means for securing a horn to each end of said shaft adjacent but within the upper inverse bend.

2. In a sound locator, a pair of spaced standards, a horizontal shaft journalled therein, a pair of sound locator horns, each horn having a double U bend therein, and means for securing a horn to each end of said shaft adjacent but within the upper inverse bend.

3. In a sound locator, a pair of spaced standards, a horizontal shaft, anti-sound transmitting means for journalling said shaft in said standards, a pair of sound locator horns, each horn having a double U bend therein, and means for securing a horn to each end of said shaft adjacent but within the upper inverse bend.

4. In a sound locator, a pair of spaced sound locator horns, a shaft for supporting said horns, and a soundless journal support and rotating means therefore comprising an anti-friction bearing, a block of rubber between said bearing and shaft, a torque arm on said shaft, and means for rotating said shaft through said arm including rubber pads between said arm and driving means.

5. In a sound locator, a pair of spaced sound locator horns, a shaft for supporting said horns, and a soundless journal support and rotating means therefor comprising an anti-friction bearing having inner and outer races, a block of rubber between said bearing and shaft, a torque arm on said shaft, and means for rotating said shaft through said arm including rubber pads between said arm and driving means and including means for turning the inner race of said anti-friction bearing.

6. A sound locator truck including a pair of spaced standards, a horizontal shaft journalled therein, a pair of sound locator horns, each horn having a double U bend therein and each horn being made up of detachable sections, the outer section being detachably secured to the inner section adjacent the first U bend, and means whereby said outer section may be clamped to the truck in an inverted position when detached for transporting purposes.

7. In a sound locator truck, a pair of spaced standards, a horizontal shaft journalled therein, a pair of sound locator horns, each horn having a double U bend therein and each horn being made up of detachable sections, the outer section being detachably secured to the inner section adjacent the first U bend, and an additional detachable support for the outer end of the outer section.

8. In a sound locator, a pair of spaced standards, a shaft journalled therein, a pair of sound locator horns, each horn having a double U bend therein, means for securing a horn to each end of said shaft adjacent but within the upper inverse bend, and a bracket extending from said means across the outer U bend to support the outer end of each horn.

9. A sound locator truck including a pair of spaced standards, a horizontal shaft journalled therein, a pair of sound locator horns, each horn having a double U bend therein and each horn being made up of detachable sections, the outer section being detachably secured to the inner section adjacent the first U bend, an additional detachable support for the outer end of the outer section, and means whereby said outer section may be clamped to the truck in an inverted position when detached for transporting purposes.

10. In a sound locator, a pair of spaced sound locator horns, a shaft for supporting said horns, and a soundless journal support and rotating means therefor comprising an anti-friction bearing, a block of rubber between said bearing and shaft, a torque arm on said shaft, and means for rotating said shaft through said arm including rubber pads between said arm and driving means and a drive shaft therefor having a sound absorbing joint therein.

11. In a sound locator, a pair of spaced standards, a horizontal shaft, anti-sound transmitting means for journalling said shaft in said standards, a pair of sound locator horns, each horn having a double U bend therein, means for securing a horn to each end of said shaft adjacent but within the upper inverse bend, a comparator, and anti-sound transmitting means for transmitting the position of said horns to said comparator.

12. In a sound locator, a pair of spaced standards, a horizontal shaft, anti-sound transmitting means for journalling said shaft in said standards, a pair of sound locator horns, each horn having a double U bend therein, means for securing a horn to each end of said shaft adjacent but within the upper inverse bends, a comparator, and mechanical transmitting means for transmitting the position of said horn to said comparator including sound-absorbing means in said mechanical transmitting means.

In testimony whereof I have affixed my signature.

FRANK R. HOUSE.